United States Patent
Lee

(10) Patent No.: US 7,564,463 B2
(45) Date of Patent: Jul. 21, 2009

(54) APPARATUS AND METHOD FOR CHANGING COLORS OF DATA AND A BACKGROUND IN A PORTABLE TERMINAL

(75) Inventor: Seok-Hoon Lee, Gumi-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 706 days.

(21) Appl. No.: 11/011,688

(22) Filed: Dec. 15, 2004

(65) Prior Publication Data

US 2005/0148371 A1 Jul. 7, 2005

(30) Foreign Application Priority Data

Jan. 5, 2004 (KR) .................. 10-2004-0000422

(51) Int. Cl.
| G09G 5/00 | (2006.01) |
| G09G 5/36 | (2006.01) |
| G09G 5/32 | (2006.01) |
| G06K 9/00 | (2006.01) |
| G06F 3/00 | (2006.01) |

(52) U.S. Cl. ................. 345/581; 345/589; 345/593; 345/520; 345/549; 382/162; 382/165; 715/700

(58) Field of Classification Search .............. 345/581, 345/589, 593–594, 597, 549, 618–619, 690, 345/520, 522, 636; 382/162–167; 358/515–521; 455/566, 11.1; 715/700, 764, 780
See application file for complete search history.

(56) References Cited

U.S. PATENT DOCUMENTS

| 5,953,090 | A | * | 9/1999 | Ozeki et al. ................. 349/121 |
| 6,322,447 | B1 | * | 11/2001 | Okada et al. ................. 463/31 |
| 6,542,140 | B1 | * | 4/2003 | Ishigami ...................... 345/88 |
| 2002/0139238 | A1 | * | 10/2002 | Mukaino et al. .............. 84/622 |
| 2003/0030634 | A1 | * | 2/2003 | Sang'udi et al. ............ 345/418 |
| 2004/0110540 | A1 | * | 6/2004 | Sato et al. .................... 455/566 |
| 2005/0065425 | A1 | * | 3/2005 | Matsumoto ................. 600/407 |
| 2005/0068320 | A1 | * | 3/2005 | Jaeger ......................... 345/440 |
| 2005/0275626 | A1 | * | 12/2005 | Mueller et al. .............. 345/156 |
| 2006/0095252 | A1 | * | 5/2006 | Takagi et al. ................ 704/200 |
| 2007/0041640 | A1 | * | 2/2007 | Tabata et al. ................ 382/173 |

FOREIGN PATENT DOCUMENTS

| EP | 1 178 650 A2 | 2/2002 |
| EP | 1 320 245 A1 | 6/2003 |
| EP | 1 324 578 A2 | 7/2003 |
| GB | 2 292 043 A | 2/1996 |
| JP | 2001-282751 | 10/2001 |
| JP | 2001-308991 | 11/2001 |

* cited by examiner

*Primary Examiner*—Wesner Sajous
(74) *Attorney, Agent, or Firm*—Roylance, Abrams, Berdo & Goodman, LLP

(57) ABSTRACT

Apparatus and method for displaying input data in various colors on a display in a portable terminal is provided. If a user selects a data color change, data is displayed in a random color. If the user selects a user selection-based data color change, the data is displayed in a user-selected color.

19 Claims, 4 Drawing Sheets

APPARATUS AND METHOD FOR CHANGING COLORS OF DATA AND A BACKGROUND IN A PORTABLE TERMINAL

PRIORITY

This application claims the benefit under 35 U.S.C. § 119 (a) of an application entitled "Method of Changing Colors of Data and Background in a Portable Terminal" filed in the Korean Intellectual Property Office on Jan. 9, 2004 and assigned Ser. No. 2004-422, the entire contents of which are incorporated herein by reference.

BACKGROUND OF THE INVENTION

1. Field of the Invention

The present invention relates generally to dialing in a portable terminal. In particular, the present invention relates to an apparatus and method for presenting the dialing digits and background of a portable terminal in various colors.

2. Description of the Related Art

With the recent widespread use of color portable terminals, users have become accustomed to menus and characters being presented in various colors. Yet, alphanumeric data are still displayed using a default color. Similarly, the background of the display is displayed monochromatically. Thus, presentation of the background and input data in various colors according to the tastes of users will enable the provisioning of various services.

SUMMARY OF THE INVENTION

An object of the present invention is to substantially solve at least the above problems and/or disadvantages and to provide at least the advantages below. Accordingly, an object of the present invention is to provide an apparatus and method for displaying input data and the background of a display in various colors in a portable terminal.

The above object is achieved by providing an apparatus and method for changing the color of input and displayed data and the color of a background in a portable terminal.

According to one aspect of the present invention, in an apparatus and method for changing the color of input data displayed in a portable terminal, if a user pre-selects a data color change, data is displayed in a random color. If the user pre-selects a user selection-based data color change, the data is displayed in a user-selected color.

According to another aspect of the present invention, in an apparatus and method for changing a background color in a portable terminal, if a background color change is selected, a color is selected for a background and set as the background color of the portable terminal. If gradation is selected, the selected color in gradation is set as the background color of the portable terminal.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

An embodiment of the present invention will be described herein below with reference to the accompanying drawings. In the following description, well-known functions or constructions are not described in detail for conciseness.

An embodiment of the present invention is described in the context of changing the color of digit data and displaying the digit data in the changed color upon input of the digit data. Yet the operation of changing the color of input digits is a mere exemplary application. Hence, besides the digit data, entered text data, received text data, and received digit data can also be displayed in the changed color.

In the embodiment of the present invention, number types indicating the elements of digit data are three parts of a phone number: the first number, middle number, and last number. The first number of a standard wired phone number or a mobile phone number is an area code, the middle number is a central office exchange number, and the last number is a unique line number. The elements of text data can be defined by spacing or lines. Thus, a changed color is applied to text data according to spacing or lines.

Figure 1:
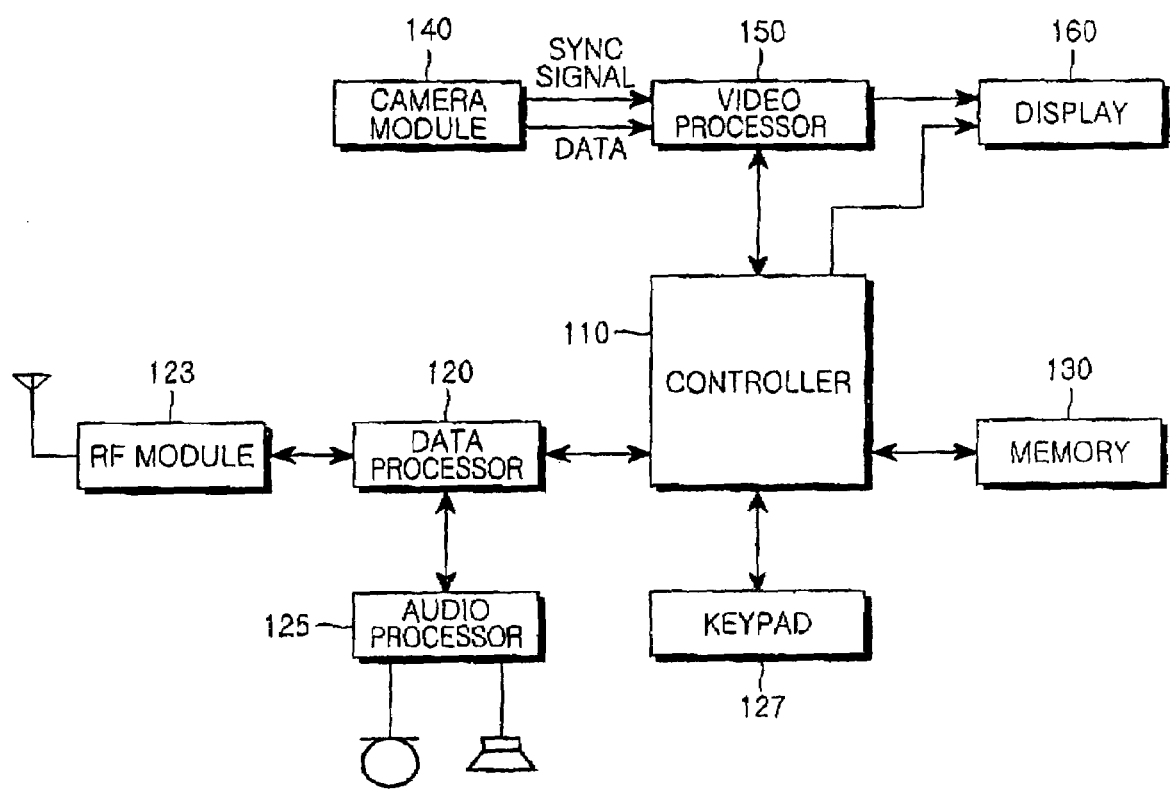
FIG. 1 is a block diagram of a portable terminal according to an embodiment of the present invention.

FIG. 1 is a block diagram of a portable terminal equipped with a camera according to an embodiment of the present invention.

Referring to FIG. 1, a Radio Frequency (RF) module 123 provides the radio communication functionality of the portable terminal. The RF module 123 includes a RF transmitter (not shown) for upconverting and amplifying the frequency of a transmission signal, and a RF receiver (not shown) for low-noise-amplifying a received signal and downconverting its frequency. A data processor 120 is provided with a transmitter (not shown) for encoding and modulating the transmission signal and a receiver (not shown) for demodulating and decoding the received signal. That is, the data processor 120 may be configured to have a MODEM and a CODEC. The CODEC includes a data CODEC for processing packet data and an audio CODEC for processing an audio signal like voice. An audio processor 125 reproduces the audio signal received from the voice CODEC of the data processor 120 on a speaker, or transmits an audio signal generated from a microphone to the audio CODEC.

A memory 130 can be configured to have a program memory and a data memory. The program memory may store programs for controlling the typical operation of the portable terminal, and programs for controlling the changing of the color of dial digits and a background according to the embodiment of the present invention. The data memory temporarily stores data generated during execution of the programs.

A controller 110 controls the portable terminal. The controller 110 may incorporate the data processor 120 therein. According to the embodiment of the present invention, the controller 110 changes the color of dialed digits by number type, digit, or central office. Also, the controller 110 displays the dialed digits in a color chosen for a number type. The controller 110 displays the background in a chosen color. If gradation is chosen, the controller 110 displays the background color in gradation. When at least two colors are chosen for the background, the controller 110 displays the background in a mixture of the colors. The mixed colors can be presented in gradation. According to the embodiment of the present invention, the controller 110 can display the background in various colors in an idle mode according to changes in the portable terminal, such as changes in reception sensitivity, temperature, and battery. If gradation is set, the background color is presented in gradation in various ways. The color and the type of gradation are randomly selected or set by the user.

A camera module 140 is provided with a camera sensor for capturing video data and converting the captured optical signal into an electrical signal, and a signal processor for converting the analog video signal received from the camera sensor into digital data. The camera sensor is assumed to be a Charge Coupled Device (CCD) sensor, and the signal processor can be implemented as a Digital Signal Processor (DSP). The camera sensor and the signal processor can be incorporated into a single device or separately configured.

A video processor 150 generates display data to display a video signal received from the camera module 140. The video processor 150 processes the video signal frame by frame and outputs the vide frame data according to the characteristics and size of a display 160. The video processor 50 has a video CODEC for compressing the video frame data in a predetermined method or recovering the compressed video frame data to the original video frame data. The video CODEC can be a Joint Picture Experts Group (JPEG) CODEC, a Moving Picture Experts Group 4 (MPEG4) CODEC, or a Wavelet CODEC. The video processor 150 is assumed to support On Screen Display (OSD) functionality. It outputs OSD data according to the size of the screen under the control of the controller 110.

The display 160 displays the video signal received from the video processor 150 and user data received from the controller 110. The display 160 can be a Liquid Crystal Display (LCD). In this case, the display 160 may include a LCD controller, a memory for storing video data, and a LCD device. If the LCD is implemented as a touch screen, it may function as a keypad. Also, the display 160 displays the dialed digits and the background in various colors according to the embodiment of the present invention.

A keypad 127 includes keys for inputting digits and characters and function keys for invoking functions. According to the embodiment of the present invention, the keypad 127 may have a selection key for selecting number types, colors for the number types, and a color for the background. Hereinafter, directional keys are taken as the selection key.

It should also be appreciated by those skilled in the art that the embodiment of the present invention can also be performed using a function key or a menu key. For example, since the embodiment of the present invention can be practiced using software, the embodiment of the present invention can be practiced via a software upgrade to a conventional communication device. Selection of text and background colors can then be performed using a function or menu key.

In operation, when the user dials using the keypad 127 and sets an origination mode, the controller 110 processes the dialed information received from the data processor 120 and converts the processed signal to an RF signal through the RF module 123. A phone number entered for dialing is displayed in various colors on a digit basis or on a central office number basis. The phone number can be presented in a user-selected color or in user-selected colors for different number types. The background in an idle mode before entering the dialed digits and the background of the dialed digits can be displayed in the user-selected color, or in gradation.

When the called party generates a response signal, the controller 110 detects it through the RF 123 and the data processor 120. Then a voice communication path is established through the audio processor 125 so that the user communicates with the called party. In a call reception mode, the controller 110 detects an incoming call through the data processor 120 and generates a ring signal through the audio processor 125. When the user answers, the controller 110 establishes a voice communication path through the audio processor 124 so that the user can communicate with the caller. While voice communications in the origination and reception modes are used as examples, data communications such as packet data or video data can also be performed. In the idle mode or in the case of text communication, the controller 110 displays text data processed in *the data processor 120 on the display 160.

Figure 2:
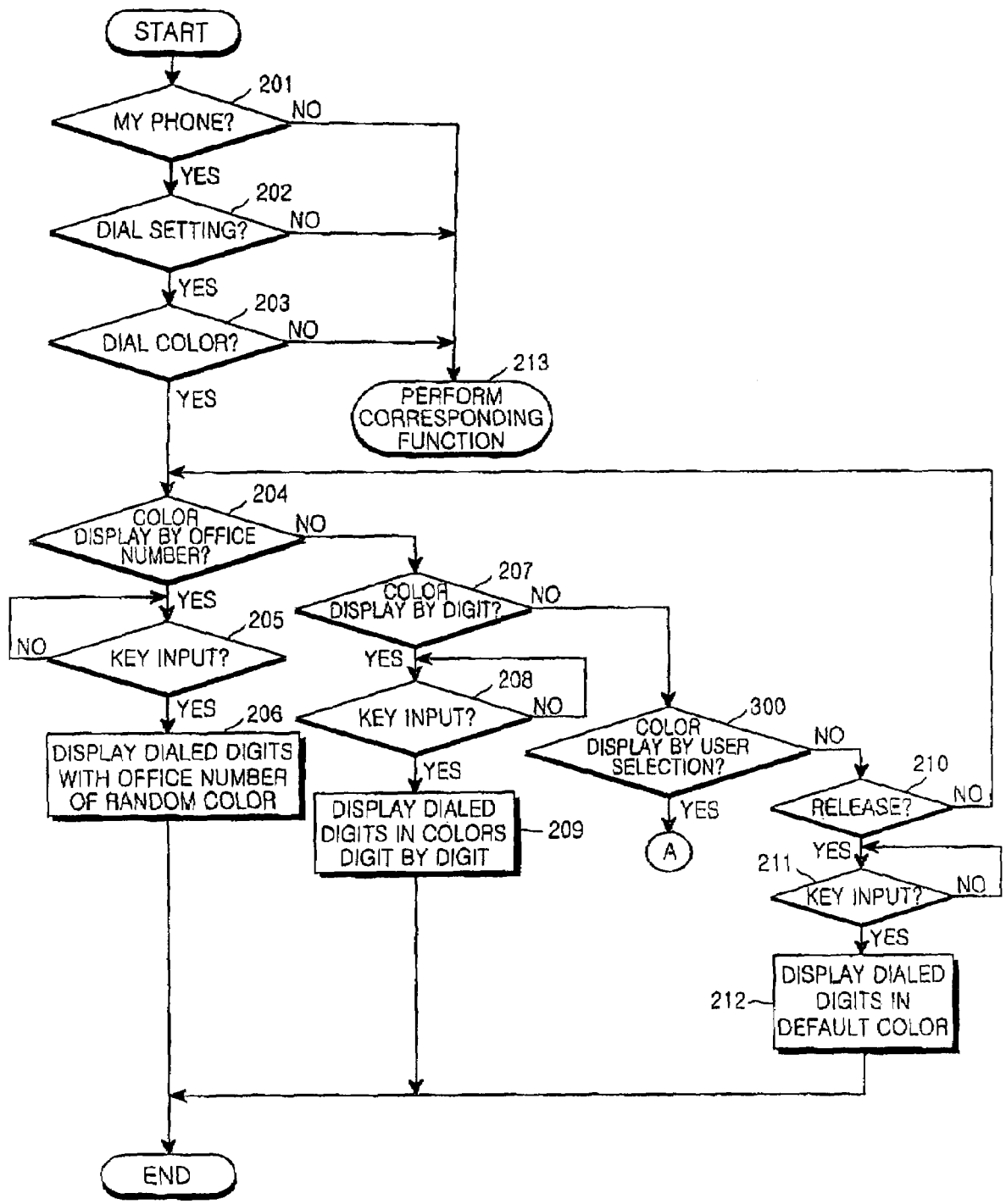
FIG. 2 is a flowchart illustrating a method of changing the color of data in the portable terminal according to the embodiment of the present invention.
Figure 3:
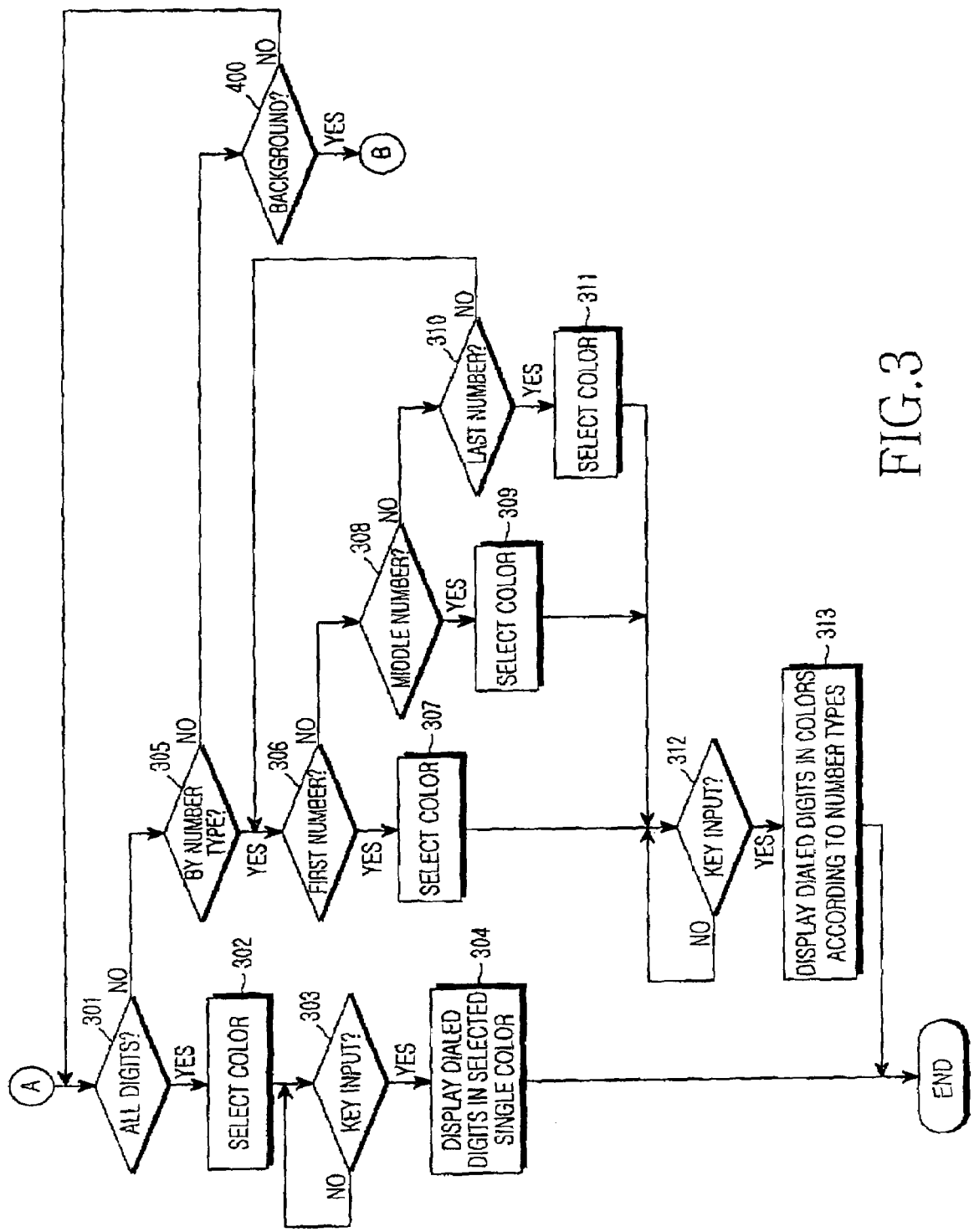
FIG. 3 is a flowchart illustrating a method of choosing a color for data by a user in the portable terminal according to the embodiment of the present invention.
Figure 4:
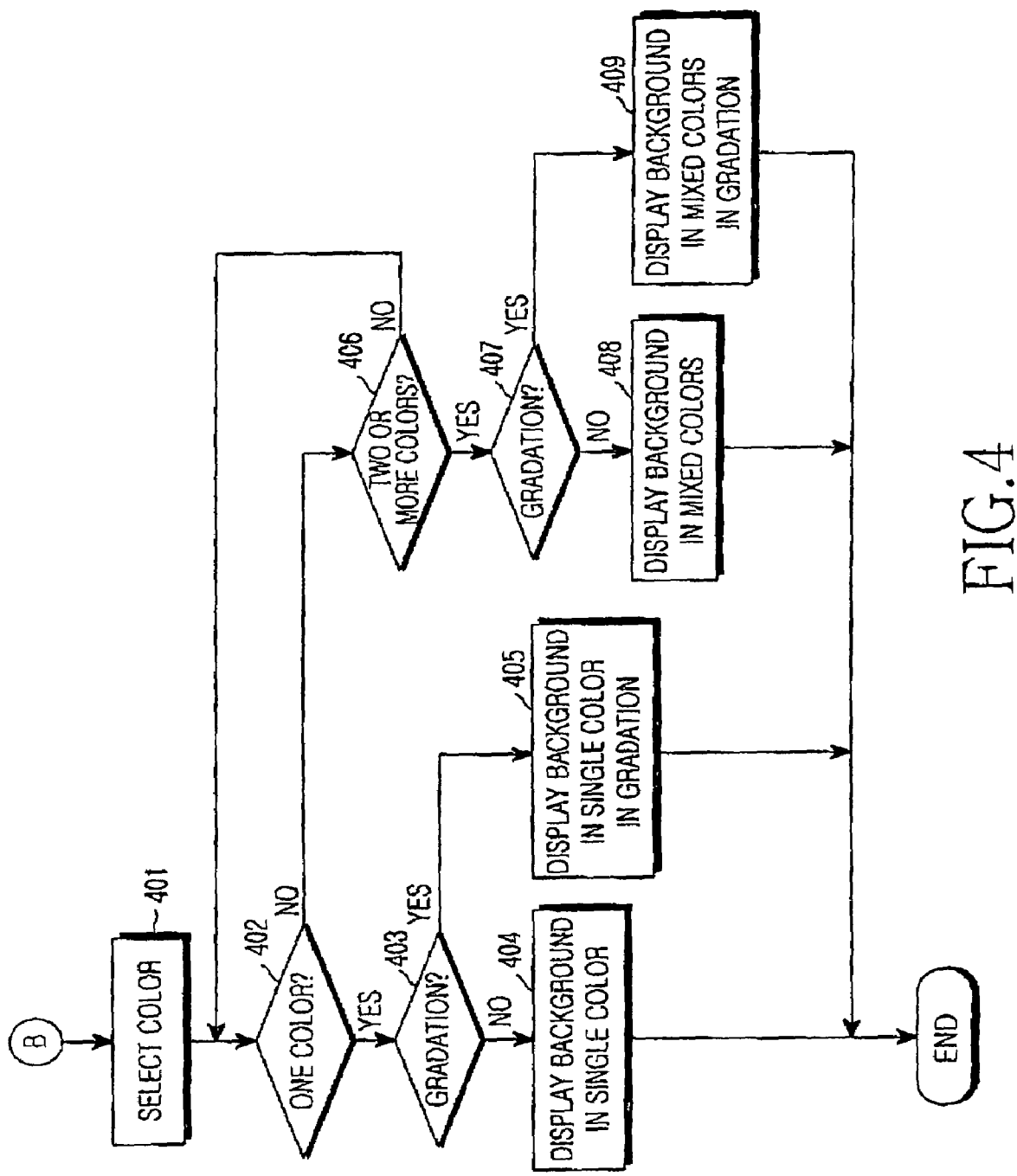
FIG. 4 is a flowchart illustrating a method of choosing a color for the background of the portable terminal by the user according to the embodiment of the present invention.

FIG. 2 is a flowchart illustrating an operation for changing the color of data, especially dialed digits in the portable terminal according to the embodiment of the present invention, FIG. 3 is a flowchart illustrating an operation for choosing a color for dialed digits by a user in the portable terminal according to the embodiment of the present invention, and FIG. 4 is a flowchart illustrating an operation for choosing a color for the background for the display of the portable terminal by the user according to the embodiment of the present invention.

Referring to FIG. 2, when the user presses a menu key through the keypad 127, the controller 110 displays a menu on the display 160. With the menu displayed, the user selects "My Phone" through the keypad 127 in step 201. The controller 110 displays menu items under "My Phone" on the display 160. With the menu items under "My Phone", the user selects "Dial Setting" and the controller 110 displays menu items under "Dial Setting" on the display 160 in step 202. If the user selects "Dial Color" from the menu items, the controller 110 displays menu items under "Dial Color" in step 203. If the user does not select "My phone" in step 201, "Dial Setting" in step 202 or "Dial Color" in step 203, the method proceeds to step 213 where other corresponding functions are performed.

Upon selection of "Color Display by Office Number" in step 204, the controller 110 sets "Dial Color" to "Color Display by Office Number". When the user enters keys for dialing in step 205, the controller 110 displays digits corresponding to a central office number in a random color in step 206. It can be further contemplated that the user selects a number type and the controller 110 correspondingly displays digits corresponding to the selected number type among the dialed digits in a random color. Upon selection of "Color Display by Digit" in step 207, the controller 110 sets "Dial Color" to "Color Display by Digit". When the user enters keys for dialing in step 208, the controller 110 displays the entered phone number digit by digit in various random colors in step 209. If the user selects "Release" in step 210 and enters digits for dialing in step 211, the controller 110 displays the digits in a default color in step 212. If the user selects "Color Display by User Selection" in step 300, the controller 110 performs an operation for allowing the user to select a color for dialed digits and a background. This operation will be detailed with reference to FIG. 3.

Referring to FIG. 3, upon selection of "Color Display by User Selection" in step 300 of FIG. 2, the controller 110 displays menu items under "Color Display by User Selection" on the display 160. If the user selects "Every Digit" using a directional key in step 301, selects a color using the direction key in step 302, and enters digits for dialing in step 303, the controller 110 displays all the digits in the selected color in step 304.

If the user selects "By Number Type" in step 305, the controller 110 displays numbers types on the display 160. Upon selection of "First Number" by directional keys in step 306, the controller 110 detects it and the user selects a color for the first number in step 307. Upon selection of "Middle Number" by directional keys in step 308, the controller 110 detects it and the user selects a color for the middle number in step 309. Upon selection of "Last Number" by directional keys in step 310, the controller 110 detects it and the user selects a color for the middle number in step 311. After the user selects a color for his selected number type, the user enters digits for dialing in step 312 and the controller 110 displays digits corresponding to the selected number type in the selected color in step 313. While the dialed digits are displayed in a selected single color in the embodiment of the present invention, the user can select a plurality of colors so that the dialed digits are displayed in different colors. Without step 305, the user may select a color for "First Number",. "Middle Number", or "Last Number" directly after selecting "Color Display by User Selection".

If the user selects "Background" as a menu item under "Color Display by User Selection" in step 400, the controller 110 detects it and the user selects a color for the background. The operation for changing the color of the background will be described in more detail with reference to FIG. 4. While the background of an idle mode and the background of a dial input mode in which dialed digits can be input are displayed in a color selected as a background color in the embodiment of the present invention, colors for the backgrounds can be selected separately. Also, a background setting menu can be separately provided in the portable terminal.

Referring to FIG. 4, when the user selects "Background" in step 400 of FIG. 3, the controller 110 detects it and displays available colors for the background. The user selects desired colors in step 401 and the controller 110 counts the selected colors in step 406. If the controller 110 determines that the user has selected one color in step 402, it sets the selected color as a background color for the portable terminal. In step 403, the controller 110 determines whether the user has selected "Gradation". Upon selection of "Gradation", the controller 110 displays the background in the selected color by gradation in step 405. If the user does not select "Gradation", the controller 110 displays the background in the selected color in step 404.

Meanwhile, if at least two colors are selected for the background in step 406, the controller 110 sets a mixture of the colors as the background color. If the user selects "Gradation" in step 407, the controller 110 displays the background in a mixture of the selected colors by gradation in step 409. If the user does not select "Gradation" in step 407, the controller 110 displays the background in a mixture of the selected colors in step 408.

After setting the background color in the above-described manner, when the controller 110 detects a change in the portable terminal such as changes in reception sensitivity, battery, and temperature in the idle mode, it can control the background to be presented in a changed color according to the change. If the background is displayed by color gradation, the controller 110 can provide various gradation types according to the change of the portable terminal, and that dynamically. The color or gradation type changed according to the change of the portable terminal is randomly given or by user selection. The color and gradation type in the idle mode may vary every predetermined time period as well as with the change of the portable terminal.

Upon input of dialed digits in the idle mode, the controller 110 transitions the portable terminal to the dial input mode. In the dial input mode, the background is displayed in the color selected in the procedure of FIG. 4. The controller 110 can control the color and gradation type of the background to be changed at every input of dialed digits.

In accordance with the embodiment of the present invention as described above, text and digit data and a background can be displayed in various colors according to the tastes of a user in a portable terminal.

While the invention has been shown and described with reference to a certain embodiment thereof, it should be understood by those skilled in the art that various changes in form and details may be made therein without departing from the spirit and scope of the invention as defined by the appended claims.

What is claimed is:

1. A method of displaying input data in various colors on a display in a portable terminal, comprising the steps of:
    displaying in the display of the portable terminal input data in a random color, if user selects random color change function for the input data, said random color being determined by types of the input data comprising text and digits, or elements of the input data; and
    displaying the input data in a specific color selected by the user, if the user selects a user-specific color change function, said specific color being determined according to the types of the input data, or for all of the input data.

2. The method of claim 1, wherein the step of displaying input data in a random color comprises the steps of:
    displaying random color change types when the user selects the random color change function;
    displaying the input data in the random color according to the type of input data, if the user selects a random color change by data type function; and
    displaying a selected input data element in the random color, if the user selects a random color change by input data element type function.

3. The method of claim 1, wherein the step of displaying the input data in a specific color selected by the user comprises the steps of:
    selecting a specific color change type, if the user selected -the user-specific color change function;
    selecting a specific color, if the user selects an all input data color change function;
    displaying all of the data in the user-specified color;
    selecting a color for each input data element type, if the user selects a specific color change by data element type function among the -specific color change types; and
    displaying the elements of input data in the user-specified colors for the input data element types.

4. The method of claim 2, wherein said input data element type comprises portions of a phone number displayed in a random color.

5. The method of claim 4, wherein said input data element type comprises an area code, a central office exchange and a line number each displayed in a random color.

6. The method of claim 1, wherein each text or digit in the input data comprises a different color.

7. The method of claim 3, wherein said input data element type comprises portions of a phone number displayed in a user-specified color.

8. The method of claim 7, wherein said input data element type comprises an area code, a central office exchange and a line number each displayed in a user-specified color.

9. The method of claim 1, further comprising the step of displaying the input data in a default color if the user selects a color setting release function.

10. The method of claim 1, further comprising the step of selectively setting a background color in the portable terminal.

11. The method of claim 1, further comprising the steps of:
selecting a color for a background when a background color change function is selected;
setting the selected color for the background of the portable terminal; and
setting the selected color in gradation for the background of the portable terminal, if a gradation function is selected.

12. The method of claim 11, further comprising the steps of:
setting a mixture of selected colors for the background of the portable terminal, if at least two colors are selected for the background; and
setting the mixture of the selected colors in gradation for the background of the portable terminal, if the gradation function is selected.

13. The method of claim 11, wherein the step of selecting a color for a background comprises the steps of:
displaying background types when the background color change function is selected;
selecting a first color for an idle mode background, if the idle mode background function is selected; and
selecting a second color for a background of a data input and display mode when the background of the data input and display mode function is selected.

14. The method of claim 13, further comprising the steps of:
displaying the idle mode background in the first color in gradation according to a change in status or temperature of the portable terminal in the idle mode; and
displaying the data input and display mode background in the second color in gradation according to the change of the portable terminal in the data input and display mode.

15. An apparatus adapted to display input data in various colors in a portable terminal, comprising:
a keypad adapted to enter the data; a memory adapted to store user information on data color choices;
a display adapted to display the input the data; and a controller adapted to display data in a random color on the display, if a user selects a data color change for the input data, said random color being determined by types of the input data comprising text and digits, or elements of the input data, and display the data in a color selected by the user if the user selects a user selection-based data color change, said color being determined according to the types of the input data, or for all of the input data.

16. The apparatus of claim 15, wherein the input data comprises text and digits.

17. The apparatus of claim 15, wherein the controller is further adapted to display random color change types when the user selects the random color change function, display the input data in the random color according to the type of data, if the user selects a random color change by input data type and display a selected input data element in the random color if the user selects a random color change by input data element type.

18. The apparatus of claim 15, wherein the controller is further adapted to select a specific color change type if the user selected the user-specific data color change function, select a specific color if the user selects an all data color change function, display all of the input data in the selected color, select a color for each input data element type if the user selects a specific color change by data element type function among the user-specific color change types, and display the elements of input data in the user-specified colors for the data element types.

19. The apparatus of claim 17, wherein said input data element type comprises an area code, a central office exchange and a line number.

* * * * *